US009672245B2

(12) United States Patent
Lee et al.

(10) Patent No.: US 9,672,245 B2
(45) Date of Patent: Jun. 6, 2017

(54) MEMORY STORAGE APPARATUS, METHOD OF SUPPORTING TRANSACTION FUNCTION FOR DATABASE, AND MEMORY SYSTEM

(71) Applicants: RESEARCH & BUSINESS FOUNDATION SUNGKYUNKWAN UNIVERSITY, Suwon-si (KR); SNU R&DB Foundation, Seoul (KR)

(72) Inventors: Sang Won Lee, Gunpo-si (KR); Woon Hak Kang, Suwon-si (KR); Gih Wan Oh, Suwon-si (KR); Bongki Moon, Seoul (KR)

(73) Assignees: Research & Business Foundation Sungkyunkwan University, Suwon-si (KR); SNU R&DB Foundation, Seoul (KR)

( * ) Notice: Subject to any disclaimer, the term of this patent is extended or adjusted under 35 U.S.C. 154(b) by 392 days.

(21) Appl. No.: 14/268,523

(22) Filed: May 2, 2014

(65) Prior Publication Data

US 2015/0006591 A1    Jan. 1, 2015

(30) Foreign Application Priority Data

Jul. 1, 2013    (KR) .......................... 10-2013-0076665

(51) Int. Cl.
*G06F 17/30* (2006.01)
(52) U.S. Cl.
CPC ............................. *G06F 17/30377* (2013.01)
(58) Field of Classification Search
None
See application file for complete search history.

(56) References Cited

U.S. PATENT DOCUMENTS 6,651,073 B1 *  11/2003  Lyle ..................... G06F 11/1471
2009/0055578 A1 *  2/2009  Lee ..................... G06F 12/0246
711/103

FOREIGN PATENT DOCUMENTS

KR    10-2009-0021063    2/2009

OTHER PUBLICATIONS

Beyond Block I/O): Rethinking Traditional Storage Primitives written by Xiangyong Uoyang, DOI: 10.1109/HPCA.2011. 5749738, IEEE, Date of Conference: Feb. 12-16, 2011, p. 301-311.*
MixSL: An Efficient Transaction Recovery Model in Flash-Base DBMS written by Yulei Fan, Book Title: Web-Age Information Management, Book Subtitle: 14th International Conference, WAIM 2013, Beidaihe, China, Jun. 14-16, 2013. Proceedings, pp. pp 393-404.*
Kang, Woon-Hak, et al. "X-FTL: transactional FTL for SQLite databases." Proceedings of the 2013 international conference on Management of data. ACM, 2013.
Korean Office Action mailed May 29, 2014 in counterpart Korean Application No. 10-2013-0076665 (4 pages, in Korean).

* cited by examiner

*Primary Examiner* — Robert Beausoliel, Jr.
*Assistant Examiner* — Hau H Hoang
(74) *Attorney, Agent, or Firm* — NSIP Law

(57) ABSTRACT

A memory storage apparatus interworking with a database management system and a file system includes a flash translation layer (FTL) configured to guarantee atomicity of a transaction for the database management system by utilizing a copy-on-write (CoW) mechanism.

17 Claims, 16 Drawing Sheets (a) GC validity 30%

(b) GC validity 50%

(c) GC validity 70%

FIG. 6

I/O Count (# of updated pages per transaction=5, GC validity=50%)

| Mode | Host-side | | | | | FTL-side | | | |
|---|---|---|---|---|---|---|---|---|---|
| | SQLite | | File System | Total Counts | fsync calls | Write | GC | Erase | Read |
| | DB | Journal | | | | | | | |
| RBJ | 6,230 | 7,222 | 15,987 | 29,439 | 2,999 | 243,639 | 756 | 2,044 | 9,792 |
| WAL | 3,532 | 5,754 | 3,646 | 12,923 | 1,013 | 92,979 | 409 | 897 | 3,472 |
| X-FTL | 5,211 | 0 | 994 | 6,205 | 994 | 33,239 | 115 | 243 | 2,011 |

(a) Write count (b) Garbage collection count

FIG. 8

| (b) GC validity 50% | RLBenchmark | Gmail | Facebook | WebBrowser |
|---|---|---|---|---|
| # of database files | 1 | 2 | 11 | 6 |
| # of tables | 3 | 31 | 72 | 26 |
| # of queries | 82,234 | 15,533 | 4,924 | 7,929 |
| # of select queries | 5,200 | 3,540 | 1,687 | 1,954 |
| # of join queries | 0 | 1,381 | 28 | 1,351 |
| # of insert queries | 51,002 | 7,288 | 2,403 | 1,261 |
| # of update queries | 26,000 | 889 | 430 | 1,813 |
| # of delete queries | 3 | 2,357 | 117 | 1,373 |
| Average updated pages per transaction | 3.31 | 4.93 | 2.29 | 2.95 |
| # of DDL/SQLite commands | 30 | 78 | 259 | 177 |

FIG. 10

TPC-C Workloads

| Transaction Types | Delivery | Order Status | Payment | Stock Level | New Order |
|---|---|---|---|---|---|
| Write-intensive | 4% | 4% | 43% | 4% | 45% |
| Read-intensive | 0% | 50% | 0% | 45% | 5% |
| Selection-only | 0% | 100% | 0% | 0% | 0% |
| Join-only | 0% | 0% | 0% | 100% | 0% |

FIG. 11

TPC-C Performance

| (measured in tpmC) | Write intensive | Read intensive | Selection only | Join only |
|---|---|---|---|---|
| WAL | 251 | 3,942 | 281,856 | 35,662 |
| X-FTL | 582 | 9,925 | 277,586 | 35,888 |

FIG. 13

SQLite Restart Time

| mode | Rollback | Write-ahead log | X-FTL |
|---|---|---|---|
| (msec) | 20.1 | 153.0 | 3.5 |

MEMORY STORAGE APPARATUS, METHOD OF SUPPORTING TRANSACTION FUNCTION FOR DATABASE, AND MEMORY SYSTEM

This application claims the benefit under 35 USC 119(a) of Korean Patent Application No. 10-2013-0076665 filed on Jul. 1, 2013, in the Korean Intellectual Property Office, the entire disclosure of which is incorporated herein by reference for all purposes.

BACKGROUND OF THE INVENTION

1. Field

The following description relates to a database system such as an apparatus and method for enhancing input/output (IO) performance of a database system.

2. Description of Related Art

A majority of applications such as Facebook, Twitter, G-mail, and the like, operating in mobile devices such as smartphones use SQLite to manage data. The reason for using SQLite in mobile devices is because SQLite enhances productivity of development through an SQL interface and provides a transaction functionality.

However, a page-based journaling technique introduced for SQLite to provide a transaction function lays a heavy burden on an IO system of smartphones.

FIG. 1 is a diagram illustrating a journal mode of SQLite.

Referring to FIG. 1, a technique used by SQLite is storing the entirety of a page before being updated in a separated rollback file (rollback mode) or duplicating an updated page in a separate file called a write-ahead log (WAL) and reflecting the same in the original database later (WAL mode) when performing updating. However, the journaling technique of SQLite has a structural problem causing a great deal of IOs, so it has been known to lay a heavy burden on a storage of a smart phone which is relatively slow. In particular, 70% of write IO commands generated in an Android platform have been known to be related to the SQLite. Since the number of smartphone platforms such as Android is anticipated to exceed the number of PCs in the future, it is important to enhance performance of SQLite.

As a result, SQLite triggers a great deal of write operations with a rollback journal file and a WAL file to support transaction atomicity and durability, and in particular, it frequently calls a 'sync' call to guarantee complete writing from a buffer of an operating system to a storage explicitly. The IO inefficiency of the journaling technique is pointed out as a major reason for inefficiency of applications using SQLite.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a memory storage apparatus includes a flash translation layer (FTL) configured to guarantee atomicity of a transaction for a database management system by utilizing a copy-on-write (CoW) mechanism, wherein the memory storage apparatus is configured to interwork with the database management system and a file system.

The FTL may include a transaction table generation unit configured to generate a transaction table that manages a transaction; and the transaction table may include at least one of a transaction ID identifying a transaction, a logical page position, a physical page position, and information regarding a current state information of a transaction, with respect to each page.

The FTL may be configured to use a mixture of a page mapping table showing a mapping relationship between a logical page position and a physical page position and a transaction table.

The transaction table may include the information regarding a current state information of a transaction, and the information regarding a current state of a transaction may include information regarding whether a corresponding transaction is in progress, whether a corresponding transaction is a committed transaction, or whether a corresponding transaction is an aborted transaction.

The FTL may not select pages written in previous positions of pages updated in the transaction table as victim pages until before a transaction is committed, and in response to the transaction being aborted, the FTL may use the pages for a rollback operation.

In response to an activated transaction having been successfully committed, the FTL may exclude the pages in the previous positions maintained in the transaction table from management targets and select them as victim pages.

The FTL may use a command for performing a write request, a command for performing a read request, a command for changing a state of a transaction into commit, and a command for changing a state of a transaction into abort.

The transaction information may be added to the transaction table only at a point in time at which a write request is received in response to a particular page having been changed.

Each entry of the transaction table may be configured to be used to provide a page corresponding to each transaction request while maintaining the latest page number and a page number of an old version which has been most recently committed and recorded.

In response to a read request command being entered and an entry in which both the transaction ID and the logical page number are identical exists in the transaction table, the FTL may deliver the latest page, or otherwise, the FTL transfers the page of an old version.

In response to a commit command for committing a transaction being entered, the FTL may wait until all pages updated by a commit request-related transaction are entirely written to physical nand pages, and thereafter, the FTL may change the information regarding a current state with respect to the commit request-related transaction in the transaction table to commit, records the corresponding transaction table information in the storage permanently, and reflects the changed mapping information in the transaction table.

The memory storage apparatus may be an eMMC (embedded Multi Media Card)-based or flash memory-based storage.

In another general aspect, a method for supporting a transaction in a memory storage apparatus includes guaranteeing, using a flash translation layer (FTL) of the memory storage apparatus, atomicity of a transaction for a database management system by utilizing a copy-on-write (CoW) mechanism, wherein the memory storage apparatus is configured to interwork with the database management system and a file system.

In another general aspect, a memory apparatus includes a database management system configured to manage data of a device; a file system configured to serve as a messenger which allows the use of a transaction function between the database management system and a memory storage apparatus; and a memory storage apparatus configured to interwork with the database management system and the file system, wherein the memory storage apparatus comprises a flash translation layer (FTL) configured to guarantee atomicity of a transaction for the database management system by utilizing a copy-on-write (CoW) mechanism.

The FTL may include a transaction table generation unit configured to generate a transaction table that manages a transaction; and the transaction table may include at least one of a transaction ID identifying a transaction, a logical page position, a physical page position, and information regarding a current state information of a transaction, with respect to each page.

The database management system may be configured to turn off a journal mode in order to immediately apply a changed page to a database file rather than to a journal file.

The database management system may be configured to deliver an abort command through a device control function ioctl in order to instruct the memory storage apparatus to perform an operation related to abortion of a transaction.

In response to a particular page being modified by a transaction, the file system may deliver a transaction ID together to the memory storage apparatus.

In response to a read or write request being entered, the file system may translate the read or write request into a command in a form including a transaction ID and a logical page number for the read and write request and delivers the same to the memory storage apparatus.

In response to a function related to a commit or abort operation of a transaction being called, the file system may translate the same into a command in a form including a transaction ID and a current state of the transaction and transmit the same to the memory storage apparatus, and delete a page that remains in a buffer of the file system even after abortion of the transaction.

BRIEF DESCRIPTION OF THE DRAWINGS

FIG. 6 is a diagram illustrating an example of an I/O state when the number of updated pages per transaction is 5.

FIG. 8 is a diagram illustrating an example of four types of actual android smart phones.

FIG. 10 is a diagram illustrating an example of results of an experiment of a total of four types of workloads by adjusting percentages of five transaction types of TPC-C.

FIG. 11 is a diagram illustrating an example of results obtained through an experiment, by number of times of transaction performance.

FIG. 13 is a diagram illustrating an example of an average recovery time in three types of modes.

Figure 1:
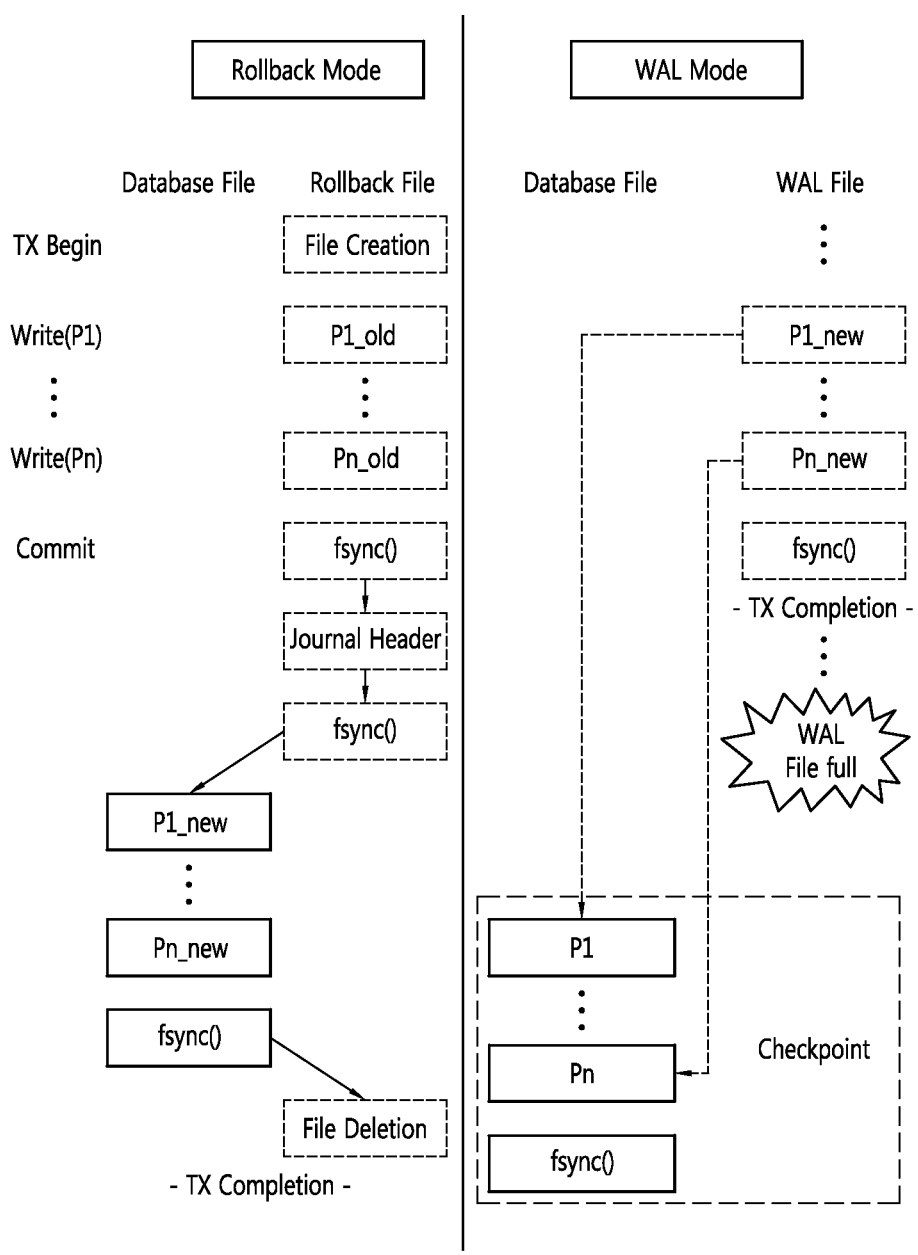
FIG. 1 is a diagram illustrating an example of a journal mode of SQLite.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 2:
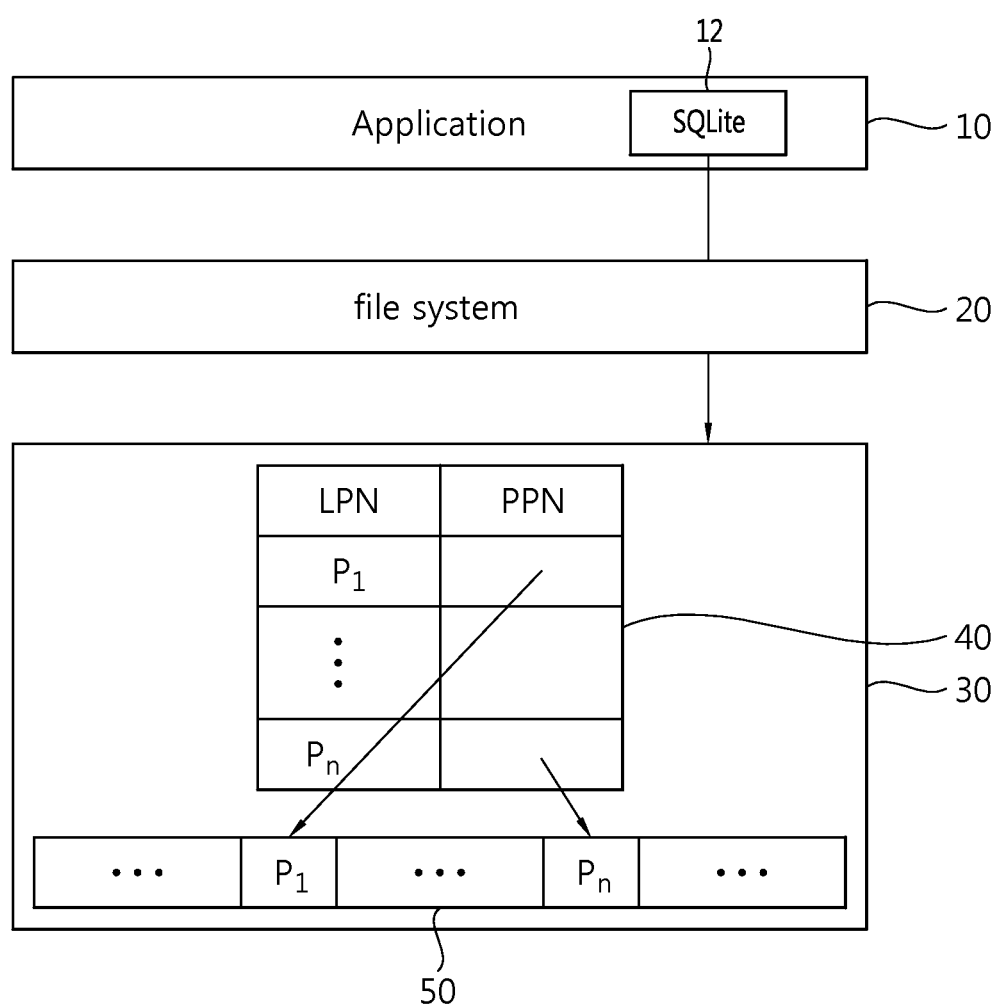
FIG. 2 is a diagram illustrating an example of a general memory system.

FIG. 2 is a diagram illustrating an example of a general memory system. As illustrated in FIG. 2, the memory system may include an application-related component 10, a file system 20, and a memory storage apparatus 30.

Referring to FIG. 2, the application-related component 10, the file system 20, and the memory storage apparatus 30 may be included in a portable terminal such as a smartphone, a PDA, a tablet PC, or the like. Here, the application-related component 10 is a component related to an application layer, which may execute an application and store and manage data generated in an application. Here, as mentioned above, the data of a majority of applications is managed by using SQLite 12. SQLite 12, which manages data, may be called a database management system, a database system, or a database system software. A rollback mode and a WAL mode of the SQLite 12 and a data journal and a metadata journal of a journaling file system may be used to guarantee atomicity with respect to write request of a page updated for a long period of waiting time of update calculation. However, journaling has shortcomings in that a great deal of repeated data write is induced in the event of page writing.

The file system 20 serves as a messenger to allow the SQLite 12 to use a transaction function of a flash translation layer (FTL) of the memory storage apparatus 30 when accessing a database in the middle of the FTL. Also, when a write request, read request, or the like, is received from the SQLite 12 of the application-related component 10 through an fsync system call or ioctl, the file system 20 translates the request into a command language form which is appropriate for an interface of the memory storage apparatus 30 and delivers the same. For example, when a read request or write request is entered, the file system 20 may translate the request into a form of read(t,p) or write(t,p) and deliver it to the interface.

The memory storage apparatus 30 may receive a command from the file system 20 and perform a transaction. The memory storage apparatus 30 may receive a read or write command from the file system 20 through a storage interface. In this example, the memory storage apparatus 30 may be an eMMC (embedded Multi Media Card) or a flash-based SSD (Solid State Drive). However, the present invention is not limited thereto.

The memory storage apparatus 30 may include a storage interface. Also, the memory storage apparatus 30 may include a flash translation layer (FTL) used as firmware. The FTL may store a page in a flash chip 50 through a logical-physical page mapping table 40. The logical-physical page mapping table 40 may explain a matching relationship between logical positions of respective pages and physical pages corresponding to the logical positions and storing actual pages. However, the logical-physical page mapping table 40 is not able to provide transaction information of pages currently delivered to the storage 30, having a limitation in utilization of a transaction function.

A majority of mobile devices use the flash memory-based storage 30 as a basic internal storage. The flash memory-based storage 30 does not permit overwrite in terms of its characteristics, so it writes an updated page in a different empty position, while leaving an existing page as is. This technique is called copy-on-write (CoW). CoW is similar to the journaling technique of the database system in an aspect, and updating atomicity of a database system may be supported by using CoW.

The following description relates to an FTL guaranteeing atomicity by understanding a transaction concept of the database system. This improves the paging mapping FTL having the characteristics of CoW among FTLs used as firmware of an eMMC and a flash memory-based SSD, and the file system 20 (e.g., Linux EXT4) using such atomicity, and the database system (e.g., SQLite 12).

As described above, the FTL according to an example is named as X-FTL, and the X-FTL may have the following functions.

(1) The X-FTL guarantees atomicity of transaction updating upon recognition of a transaction concept of a database.

(2) The X-FTL provides an extended API that may be used in a database system such as SQLite and a file system such as Linux EXT4.

The X-FTL according to an example, taking advantage of copy-on-write used in a flash memory storage apparatus, may be able to guarantee transaction atomicity by effectively processing the reflection of all pages translated through updating the transaction. Namely, when a transaction is normally terminated, all changed pages may be reflected in the flash memory storage apparatus, or when a transaction is aborted due to an error in the process of changing, the updated pages are not all reflected in the database.

In the above example, the X-FTL relates to three types of techniques. The techniques are as follows.

(1) Shadow Paging Technique

In the shadow paging method, pages updated by a transaction are generated as a new version, respectively, rather than directly overwriting the original database. In order to guarantee atomicity of page updating, position information of a previous page is changed into a page of a new version. Thus, the database system maintains two pages (i.e., the previous page and the updated new page) according to the updating transaction. The rollback journal of SQLite and the WAL journal technique may be modifications of the shadow paging technique. In this respect, conceptually, the X-FTL according to an example may be offloading a shadow paging technique from a database system engine to a flash memory storage system.

In the related FTL, copy-on-write is used to enhance write performance, but atomicity of a transaction can be effectively supported within a flash memory storage through offloading a simple technique. Namely, since existing paging mapping FTLs do not overwrite already updated pages, atomic write of a transaction which has updated several pages may be supported on the flash memory storage level without incurring additional costs, by extending the FTLs.

Thus, unlike the general shadow paging technique, the use of the X-FTL may reduce overhead in management of updated page mapping according to the use of the journaling technique of SQLite and recovery of a space used by a previous page.

(2) Journaling File System

A file system used in a current operating system implements a journaling technique to maintain consistency between a data block and metadata. Recently, a journaling file system for a flash memory, such as JFFS and YAFFS, has been released. Data written by a file system is first stored in a buffer of an operating system and delivered from the buffer of the operating system to a storage by a sync call of an application or a flush daemon of kernel which is periodically operated. In this case, the journaling file system such as JFFS and YAFFS stores the data block and the meta data in a separate space known as a journal area, rather than immediately reflecting them in a region where the original data stored. When all the pages are stored in the journal region, in general, the pages are reflected to a position of the original region through a process called a checkpoint. Thus, journaling file systems may be able to maintain consistency of data through an additional IO to the journal region.

In comparison, the X-FTL according to an example does not use a journal region of a file system because it already guarantees atomicity in the flash memory storage apparatus. Thus, a burden of the journaling file system repeatedly writing a data block in a journal region can be eliminated, and the same level of consistency as that provided by the journaling file system can be maintained. For this reason, performance of a transaction can be significantly enhanced. In general, data consistency of a journaling file system aims at an aggregation of fixed pages, which is not consistent with a transaction of a database system such as SQLite semantically. For this reason, SQLite implements a journal mode such as a rollback journal or WAL, apart from a consistency maintaining system of a journaling file system.

(3) Novel Storage Employing FTL Supporting Write Atomicity

Recently, flash memory-based storage techniques supporting atomic write have been proposed. However, most of the techniques consider only atomicity of a page aggregation fixed similar to a journaling file system, which are inadequate to support a transaction concept.

1) Sunhwa Park, Ji Hyun Yu, and Seong Yong Ohm. Atomic Write FTL for Robust Flash File System. In Proceedings of the Ninth International Symposium on Consumer Electronics (ISCE 2005), pages 155 160, June 2005.

This article attempts to update an aggregation of several pages atomically by utilizing the copy-on-write characteristics of the flash memory storage apparatus. However, unlike the X-FTL of this example, the article is focused on guaranteeing an atom write by processing write (p1, p2, . . . , pn) several pages through a single write operation. Thus, with this technique, when the flash memory storage apparatus receives a write command of several pages, first, the flash memory storage apparatus writes all the pages in a flash memory chip and leaves a commit record. If a system error occurs while pages are being written in the flash memory chip or before a commit record is completely written, pages changed based on a write command are all undone to previous page information.

An important target of this method is recognizing a data block of a journaling file system such as ext4 and meta data of the corresponding block, as a single transaction, to thus automatically guarantee atomicity.

2) Xiangyong Ouyang, David W. Nellans, Robert Wipfel, David Flynn, and Dhabaleswar K. Panda. Beyond Block I/O: Rethinking Traditional Storage Primitives. In Proceedings of International Conference on High-Performance Computer Architecture (HPCA 11), pages 301311, 2011.

In this article, an FTL supporting atomic updating of several pages is implemented in a commercial SSD of FusionIO. In particular, a double-write area of MySQL is replaceable by using the copy-on-write characteristics of the flash memory storage apparatus. The double-write area of the MySQL database is used to solve a partial write problem due to a system error while data pages are being written in several sectors.

However, this technique has the following problems. In order to update several pages through a single write operation, the pages should be known before performing a write system call. Thus, in database systems implementing a buffer steal replacement policy in which pages updated by a single transaction are performed through one or more write operations, atomicity of a transaction cannot be guaranteed. Also, several pages written by one or more transactions cannot be crossed.

3) Vijayan Prabhakaran, Thomas L. Rodeheffer, and Lidong Zhou. Transactional Flash. In Proceedings of Symposium on Operating Systems Design and Implementation (OSDI), 2008.

This article generally describes an FTL supporting a transaction concept of a journaling file system and names it as TxFlash. TxFlash additionally supports an isolation function not allowing the same page to be updated by several sections while supporting write atomicity of several pages. In particular, as a main purpose of TxFlash, a technique of simple cyclic commit (SCC) has been proposed to remove restrictions that a commit record should be first written and write by a different transaction should be permitted in order to commit a write system call in a journaling file system in which write of a data page and commit record are separated. SCC removes a commit record so that other write operations cannot be blocked due to a completion of a transaction. However, this technique cannot support atomicity of a transaction of a database system, like the previous techniques.

In order to achieve the above object to improve the foregoing techniques, the flash memory storage apparatus 30 layer may provide an X-FTL supporting a transaction function and portions of the database management system (e.g., SQLite) and a journaling file system (e.g., EXT4) of an application layer may be modified.

(1) X-FTL Design According to an Example

Design principles of X-FTL according to an example may be summarized by three points.

1) The X-FTL supports transaction atomicity and durability at small additional costs by utilizing the advantages of the CoW (copy-on-write) used in an FTL. In particular, a repeated write operation required for implementing the CoW technique is eliminated. This may be significantly efficient in force-at-commit when a transaction adopted in SQLite is completed.

2) The X-FTL aims at supporting any application requiring a transaction atomicity function (i.e., atomicity required for updating several pages based on a transaction concept), without being limited to SQLite. Thus, an interface is implemented to most flexibly support functions required for operating a general application such as SATA standard.

3) The X-FTL supports minimizing a change in software of SQLite and other application layers. As for a change in an existing application, only an extended interface portion is required to be changed so that a transaction function provided by the X-FTL can be used.

(2) X-FTL Structure and Interface According to an Example

An important aspect of the X-FTL is a transaction table that manages transaction information, besides a logical-physical page mapping table provided by an existing FTL. It is the portion indicated by X-L2P 42 in FIG. 3. The transaction table includes a combination of the logical-physical page mapping table 40 (please see FIG. 1) provided in a general FTL and transaction state indication information indicating transaction information regarding pages currently delivered to a storage as in-progress/commit. It is the same logical-physical mapping table managed in an existing FTL of an L2P table in a lower portion of FIG. 3.

In order for the storage layer to provide a transaction function, the transaction table includes additional information such as a transaction ID, a position in which a new page is stored, or transaction state information. Through the transaction table, pages belonging to a transaction not committed yet may be prevented from being eliminated (or reused) by a flash memory garbage collection process. This is because, when a higher layer aborts/rolls-back a transaction which has not been committed yet, pages belonging to the transaction should be undone to previous page data. If a higher layer commits a transaction, pages belonging to the corresponding transaction among pages of the X-L2P transaction table are updated in the logical-physical mapping table, and old pages are denoted as a target of garbage collection.

(3) Modification of Application and File System (e.g., SQLite and Linux EXT4)

In order for an application layer and a file system layer to use a transaction function provided by the X-FTL, an extended SATA command should be used.

First, a file system layer directly calls an extended SATA command. Since transaction commit information cannot be delivered to a storage through an existing SATA standard, the current SATA standard has been extended to this end. Through the extended SATA standard, transaction information allocated by a file system in reading/writing data is added and delivered to a storage, and transaction commit/abort information is implemented as a separate extended SATA command. Types of extended SATA commands are as follows:

write(tid t, page p): command for writing data from a host to a storage, which adds transaction information to an existing SATA command.

read(tid t, page p): command for reading data from a storage to a host, which adds transaction information to an existing SATA command. When there are one or more portions of data to be read, accurate data is transmitted according to transaction information.

commit(tid t): commands for providing committed transaction information to a storage. This command does not exist in the existing SATA standard commands, and may be added for the transaction function of the X-FTL.

abort(tid t): commands for providing aborted transaction information to a storage. This command does not exist in the existing SATA standard commands, and is added for the transaction function of the X-FTL.

The application layer such as SQLite cannot directly call an SATA command. Thus, in order for the application layer such as SQLite to call an SATA command, a device control function (ioctl( )) command of a file system is extended. The part requesting a file system to call the SATA command extended with (ioctl( )) is commit( ) and abort( ) extended SATA commands. Besides, read/write commands, which are the same as existing ones, may be used, and since a management of a transaction ID is conducted by a file system, the application layer does not deliver a transaction ID.

In addition, in case of the rollback mode and WAL (write-ahead log) mode of SQLite and the data journal and metadata journal used to guarantee atomicity with respect to a write request of an updated page for a long period of waiting time of update operation, a large amount of repeated data write may be induced in the event of page writing. Thus, the memory storage apparatus may provide the X-FTL capable of eliminating unnecessary repeated data write generated in an application of a higher stage such as SQLite or a file system by guaranteeing atomic update of a page within a flash storage.

In an example, the present disclosure has at least three objectives: First, to preserve atomicity and durability of a transaction at low cost by eliminating unnecessary page write by utilizing the characteristic copy-on-write mechanism of the most flash-based storages. In particular, it is very important in terms of buffer management of SQLite that uses a force policy at a point in time to commit to a transaction.

Second, to support atomic write with respect to updating of an individual page unit or a page group unit without the aid of SQLite or a different application. Also, the interface of the X-FTL should follow a standard interface such as SATA so as to be conveniently used.

Third, in order for applications of a higher stage such as SQLite to use the X-FTL, code correction may be required. Also, besides a code correction for a function additionally supporting the X-FTL, a minimum amount of correction should be required.

This method is a method for changing shortcomings generated as a flash-based storage does not perform overwrite into advantages, which may be able to support a transaction function without incurring additional costs, optimizing performance with respect to a write operation, and lengthening a lifespan of a storage.

Figure 3:
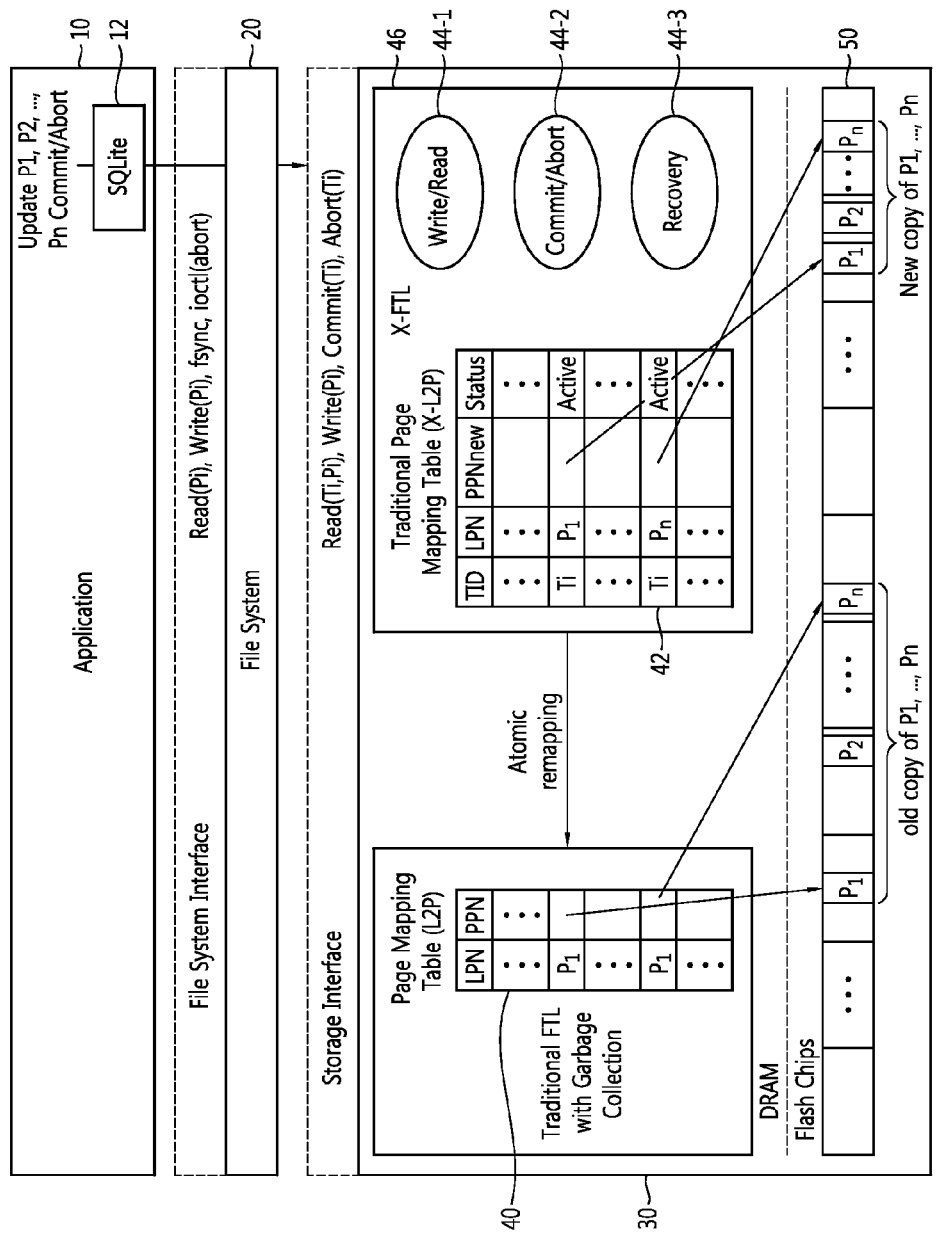
FIG. 3 is a diagram illustrating an example of a memory system.

FIG. 3 is a diagram illustrating an example of a memory system. As illustrated in FIG. 3, the memory system may include an application-related component 10, a file system 20, and a memory storage apparatus 30. Here, the application-related component 10 includes a database management system 12, and the memory storage apparatus 30 may include a flash translation layer (FTL) 46 generating a page mapping table 40 and a transaction page mapping table (or an address mapping table) 42 and controlling a transaction through the address mapping table, and a flash chip 50.

Referring to FIG. 3, the application-related component 10 may include the database management system 12 (e.g., SQLite). The conventional SQLite 12 operates in a rollback or WAL (write-ahead log) mode to guarantee atomicity, but in an example, atomicity and durability of a transaction are guaranteed through the X-FTL, a journal mode of the SQLite 12 may be set to off. Here, the off journal mode is a mode in which a changed page is immediately applied to a database file, rather than to any other journal file. In a case in which a page not committed yet is forcibly written in a database file according to a steal/force policy, a buffer management policy of the SQLite 12, corresponding page information is immediately applied to a database file in the off mode. Accordingly, if a transaction is aborted, a rollback operation cannot be performed.

However, since the X-FTL of this example supports a command for abort, a part for delivering abort command to the memory storage apparatus 30 through ioctl may be added to a code in order to call an abort function of the X-FTL in a situation in which an abort operation is required within SQLite 12.

As mentioned above, the file system 20 interposed between the SQLite 12 and the X-FTL serves as a messenger to allow the SQLite 12 to use a transaction function of the X-FTL when accessing a database. When a certain page is modified by a transaction, the SQLite 12 delivers a transaction ID together to the X-FTL, so that the X-FTL may recognize which transaction modified the page. When a read/write request is entered, the SQLite 12 translates it into a write(t,p) form and delivers it to the X-FTL.

A commit or abort operation is performed in a similar manner. That is, when a fsync system call or ioctl(abort) is called, the file system 20 translates it into a command in a commit(t) or abort(t) form, and delivers the same to the X-FTL. A page that may remain in a buffer of the file system 20 even after abort may be deleted, thus being simply removed. In order to perform a simulation related to the present embodiment, commit and abort are implemented by extending a Trim command.

Also, in order to process multiple files, a system call with respect to txopen, txcommit, txabort, and txclose may be added. This will be described below.

The memory storage apparatus 30 includes a storage interface. The storage interface may receive a command from the file system 20. The memory storage apparatus 30 may include an FTL (i.e., the X-FTL of this example). The FTL may generate a transaction mapping table 42, besides the existing page mapping table 40 (L2P), to manage pages and control a transaction. The memory storage apparatus 30 may include the flash ship 50 in which an actual page is stored.

An important aspect of the X-FTL of this example is the transaction table 42 (address mapping table X-L2P) that manages a transaction. The X-L2P table may be mixed with the page mapping table 40 (L2P) used in most FTLs, so as to be used. The L2P table 40 may be positioned in the left in FIG. 3, and the X-L2P table 42 may be positioned in the right in FIG. 3. In order to support a transaction function within the storage 30, the X-L2P table 42 manages additional information such as a transaction ID, a physical page position in which a page is actually written, or a current state of a transaction, in addition to existing L2P information. By managing such information, garbage collection may be perfectly controlled. Pages written in previous positions of pages updated within a transaction function may not be selected as victim pages until before the transaction is finished and, in the case where the transaction is aborted, the pages may be used for a rollback operation. When the activated transaction is successfully terminated, pages in the previous positions maintained in the X-L2P table 42 may be excluded from management targets and may be selected as victim pages.

In detail, the X-FTL according to an example may be implemented in OpenSSD. OpenSSD, an SSD development platform, has been released through OpenSSD Project. The OpenSSD platform, based on a barefoot controller, has performance characteristics similar to those of commercial SSD including a barfoot controller, and an FTL that manages a flash adopts a page mapping flash memory management policy which is adopted and used by most SSD and eMMC flash memories.

The X-L2P table 42 according to an example may be managed in an SDRAM of the OpenSSD platform. Also, the X-L2P table 42 stores a transaction id (tid), a logical page number (lpn), a physical page number (ppn), state information (state) of a transaction with respect to each page. Physical page information is an empty page number designated by the FTL whenever a new write request is entered with respect to a particular page. Transaction state information includes information regarding whether a corresponding transaction is still in progress, whether it has been committed, or whether it has been aborted. Also, transaction information may be added to the X-L2P table 42 only when a write request is entered as a particular page is changed.

Each entry of the X-L2P table 42 may be used to provide a page of an appropriate version with respect to a request for each transaction, while maintaining two page numbers, namely, the latest page number and a page number of an old version which has been most recently committed and recorded.

The X-FTL may use a write/read command 44-1, a commit/abort command 44-2, and a recovery command 44-3. When information regarding a transaction is delivered to the storage 30, information regarding a transaction ID cannot be delivered through an existing SATA interface, so the interface is newly extended. Also, two novel commands for changing state information (active, commit, abort) of a transaction are added. Each interface will be described as follows:

write(tid t, page p): It is a command for performing a write request. The first argument represents an ID of a transaction, and a second argument represents a logical page number for a write request. This command requests in a write request that page p be recorded in the storage 30 and a transaction ID and mapping-related information be stored in the X-L2P table 42. Mapping information includes an actual physical page address and a requested logical page address.

read(tid t, page p): The first argument represents an ID of a transaction, and the second argument represents a logical page number for a write request. This command requests for reading the latest page with respect to a logical page p of which a transaction id is t. A page of a different version is delivered according to an ID of the requested transaction.

commit(tid t): This command is newly added to support a transaction function. It is a command for changing a state of a transaction into commit. The command delivers an ID t of a transaction together. When this command is delivered, the X-FTL processes all the states of the transaction t managed in the X-L2P table 42 into commit states and reflects updated page mapping information in the L2P table 40 so as to be maintained permanently. Pages written before being updated, managed by the transaction t, may be all released to become victim pages.

abort(tid t): This command is a newly added command to support the transaction function. It is a command for changing a state of a transaction into abort. The command delivers an ID t of a transaction as an argument together. When this command is delivered, the X-FTL discards every information of the transaction t managed in the X-L2P table 42. Pages newly written after being updated may be selected as victim pages.

First, in a case in which a read command read(t,p) is entered, only when an entry in which a transaction id and a logical page number p are identical exists in the X-L2P 42, the X-FTL delivers the latest page. Otherwise, the X-FTL delivers a page of an old version. Also, when a page number of an old version is maintained so garbage collection is required, the page of an old version may not be selected as a victim page.

Also, when the commit(t) command is entered, it may wait until when all the pages updated by the transaction t are entirely written as actual physical nand pages. Thereafter, state information regarding the transaction t in the X-L2P table 42 are all changed into commit, corresponding X-L2P information is permanently recorded in a flash memory, and thereafter, the changed mapping information is reflected in the L2P table 40. A point at which this situation is completely finished is regarded as when commit is finished. This operation is similar to an operation of recording the L2P table 40 wholly in a flash memory to for the purpose of recovery, in a situation in which the conventional FTL is crashed.

Recovery

In order to recover a database, two types of error situations may be assumed: First, when SQLite is abnormally terminated, and second, a system is terminated as power supply thereto is suddenly cut off.

1) The first case is normal and there is no problem with the file system 20 or the X-FTL. Accordingly, it may be recovered simply through an abort(t) command.

2) In the second error situation, the most recently recorded L2P table 40 and X-L2P table 42 are all read from the FTL, and an additional operation may be performed according to a state of a transaction. In case of a transaction recorded in a commit state, mapping information of X-L2P is reflected in the L2P table 40, and remaining information is aborted. Through this simple operation, durability of the committed transaction can be guaranteed.

In addition, since a SATA command interface may not be directly used in an application controlling a file through the file system 20 like the SQLite 12, it may be implemented such that an ioctl function and an fsync function are extended to manage additional transaction information through the file system 20, rather than directly using a SATA command in the SQLite 12.

In addition, an interface for processing a transaction with respect to multiple files when the single transaction accesses several files in the SQLite 12 may be added. Through this, a problem of accessing multiple files within a single transaction may be solved.

Related commands are as follows:

txopen(n, fp1, fp2, fp3, . . . , fpN): It is a command for opening a transaction processing description with respect to multiple files, in which a first argument is the number of multiple files and rear arguments are file descriptors obtained through fopen. After the txopen function is executed, the file system may manage a transaction ID of a transaction accessing multiple files and process a transaction, while maintaining a single transaction descriptor with respect to multiple files.

txclose(tx): This command releases a transaction descriptor obtained through txopen. This command releases a transaction descriptor with respect to multiple files, and also releases a transaction ID managed as one.

txcommit(tx): This command performs commit command with respect to all the files tied to a transaction descriptor obtained by txopen. The files tied to the transaction descriptor are managed by a single transaction ID. Thus, a commit (tid) command is delivered to the X-FTL with respect to a single transaction ID (tid) internally managed by a transaction descriptor tx. When the X-FTL receives this command, it performs commit operations on the transaction ID tid in the same manner as a general commit process.

txabort(tx): This command performs an abort command with respect to all the files tied to a transaction descriptor obtained by txopen. The files tied to the transaction descriptor are managed by a single transaction ID. Thus, an abort(tid) command is delivered to the X-FTL with respect to a single transaction ID (tid) internally managed by a transaction descriptor tx. When the X-FTL receives this command, it performs abort operation on the transaction ID tid in the same manner as a general abort process.

Figure 4:
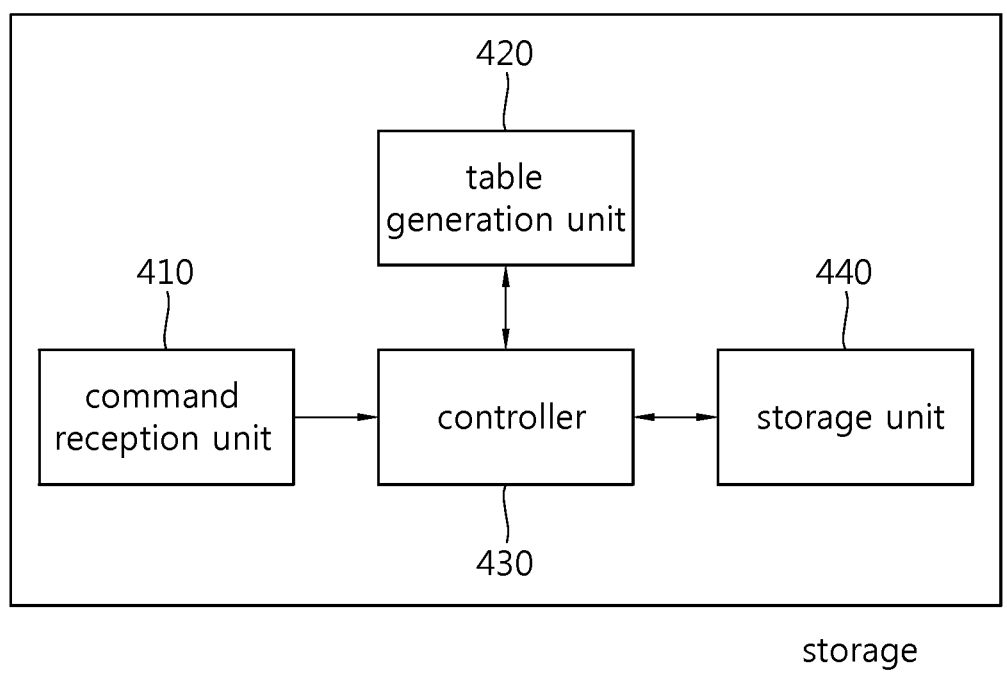
FIG. 4 is a diagram illustrating an example a memory storage apparatus.

FIG. 4 is a diagram illustrating an example of the memory storage apparatus 30. As illustrated in FIG. 4, the memory storage apparatus 30 according to an example may include a command reception unit 410, a table generation unit 420, a controller 430, and a storage unit 440.

The command reception unit 410 may be a storage interface and may receive a command from the file system 20. The command reception unit 410 may receive a command in the form of read(tid t, page p), write(tid t, page p), commit(tid t), and abort(tid t).

The table generation unit 420 may generate a transaction table as well as a logical-physical mapping table. The logical-physical mapping table includes a logical mapping table with respect to each page and information regarding a position of a physical mapping table matched thereto. The transaction table may include a transaction ID tid, a logical page position, a physical page position, and information regarding a current state of a transaction, with respect to each page. Here, the physical page position information may include information regarding a position in which a new page is stored. Also, the current state information includes information regarding whether a transaction is in progress, whether it has been terminated, or whether it has been aborted. The table generation unit 420 may generate a logical-physical mapping table and a transaction table on the basis of storage states of respective pages, and may adjust information regarding the tables upon receiving a command signal and a control signal from the command reception unit 410 and the controller 430.

The controller 430 may control the table generation unit 420 and the storage unit 440. The controller 430 may parse a command received from the command reception unit 410 to perform a corresponding command. In this case, the controller may utilize the information regarding the logical-physical mapping table and the transaction table generated by the table generation unit 420, and when information regarding a corresponding page of a table is required to be changed, the controller 430 may request change of the information. Also, the controller 430 may control an operation of reading and writing of a corresponding page, an operation of performing a transaction, an operation of termination, abort, and the like.

The storage page 440 is a component in which a page is actually stored. The storage unit 440 may be a flash chip.

Analysis of Simulation Result

An experiment was conducted to check effects of the X-FTL according to an example in SQLite and a file system. Experiment targets were rollback, wal modes, and X-FTL mode as basic modes, and the experiment was conducted on an OpenSSD board. Besides the SQLite experiment, performance of an ext4 file system was measured in order to check an influence on the file system.

Experimental Setup

The OpenSSD board was a development board with K0LCG08U1 M flash chips (Samsung) mounted thereon. The flash chip was an MLC NAND type chip in which 128 pages form one block and each page has a size of 8 KB. A controller of OpenSSD was a barefoot controller configured as 87.5 MHz Arm processor having a 96 KB SRAM space to store firmware. An SDRAM had a size of 64 MB and was used for the purpose of storing meta data such as a mapping table. An SATA interface had a version 2.0.

The following PC was used for experiment.
OS: Ubuntu 12.04, Linux kernel 3.5.2
CPU: Intel core i7-860 2.8 GHZ processor
Memory: 2 GB DRAM
File system: ext4 (ordered mode, full mode, off mode)
SQLite version: 3.7.10 rollback mode, wal mode support
Database page size: 8 KB
Workloads In order to check effects of the X-FTL, experiment data from a total of three experiments, i.e., an artificially created workload, a trace of applications frequently used in an actual android environment, and a TPC-C workload, were used. A flexible I/O (FIO) was used to evaluate performance of a file system.

Synthetic

This workload includes a partsupply table of a TPC-H benchmark created through dbgen. This table has 60000 tuples each having a size of 220 bytes. A transaction used for experiment includes a query that reads tuples having a partkey value identical to a random number, changes a supplycost row, and subsequently commits.

Android Smartphone—

This workload is tracing while driving famous applications such as RL benchmark, Gmail, Facebook, and a Web browser in an android 4.1.2 jelly bean emulator in actuality. RL benchmark is a famous performance evaluation application used to measure performance of SQLite in an android platform. The trace collected SQL statements of all transactions by modifying codes of SQLite.

TPC-C—

A TPC-C database including ten warehouses were generated by using a DBT2 tool. Two workloads, a combination workload and a read-intensive workload, were generated by adjusting ratios of five transaction types and experimenting. Since a lock unit of SQLite is a file unit, a database was connected only in a single client.

File System Benchmark—

A flexible I/O (FIO) performance evaluation tool is a tool used for evaluating performance of a file system and a storage. Several threads performing a corresponding I/O operation according to a parameter determined by a user are generated. The performance evaluation was performed to measure performance of a file system itself to determine how a random write workload is affected when the X-FTL was used.

For comparison with the existing SQLite, performance of SQLite using the X-FTL and rollback and wal journal modes were measured.

Synthetic Workload

Figure 5A:
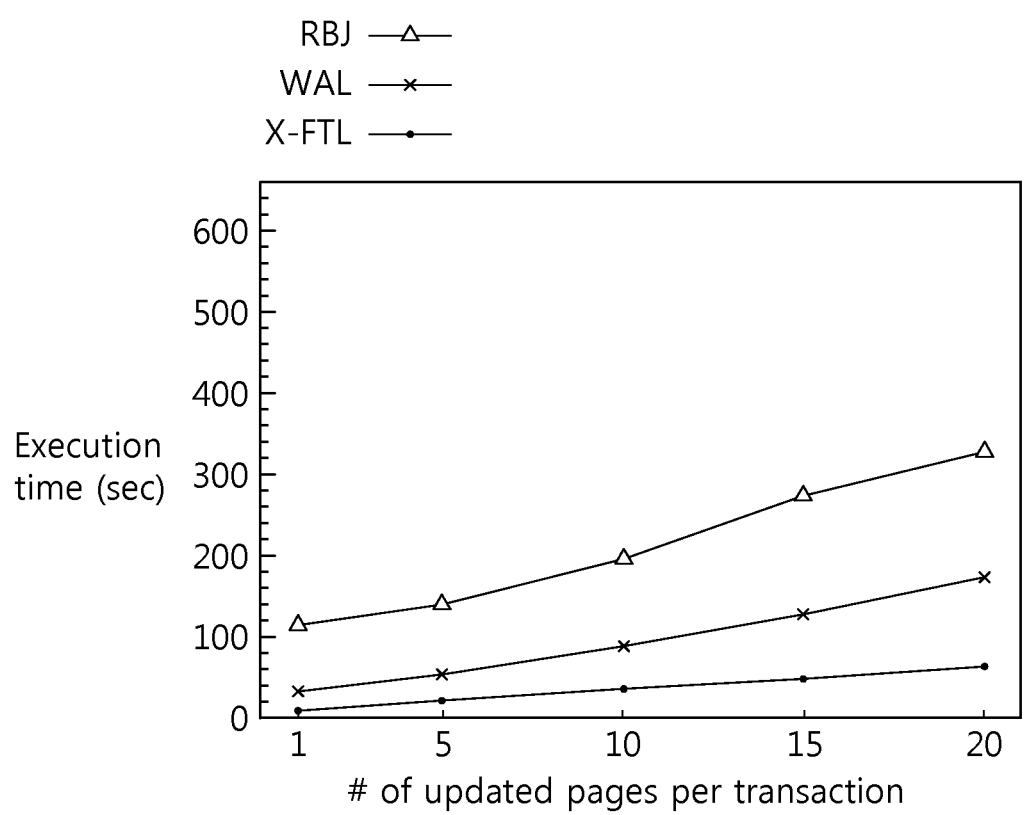
FIGS. 5A, 5B, 5C are diagrams illustrating an example of execution time of SQLite in an experiment conducted while changing a rate of valid pages per block by adjusting a degree of the use of a flash chip.
Figure 5B:
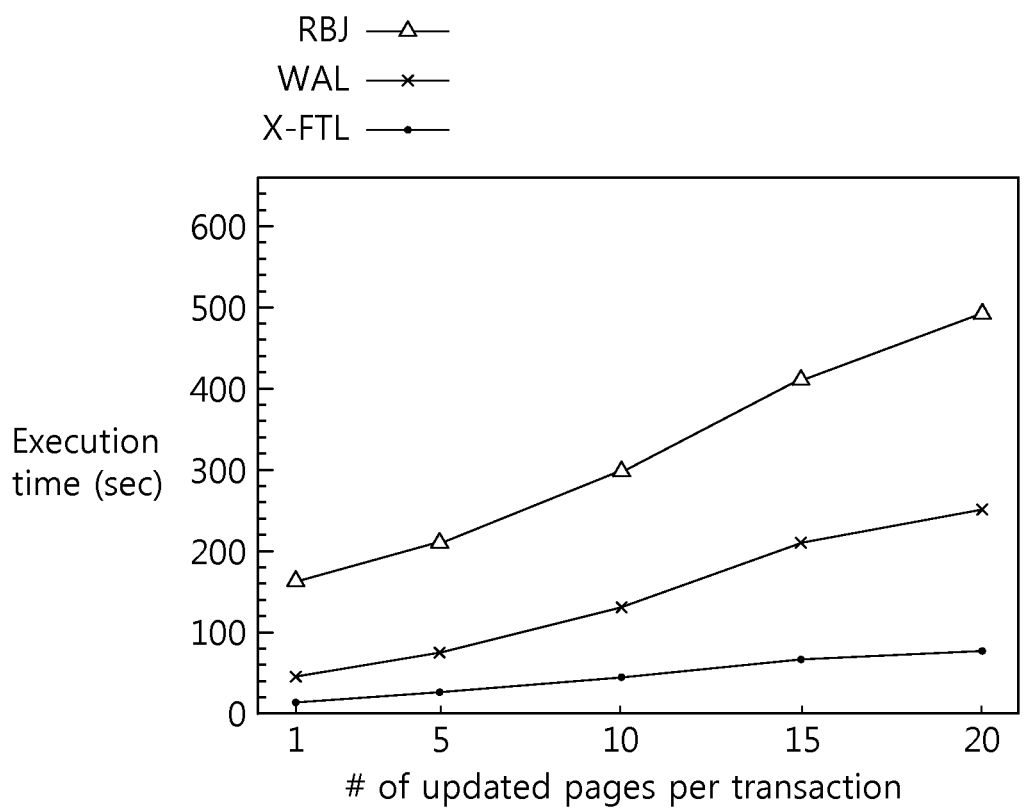
Figure 5C:
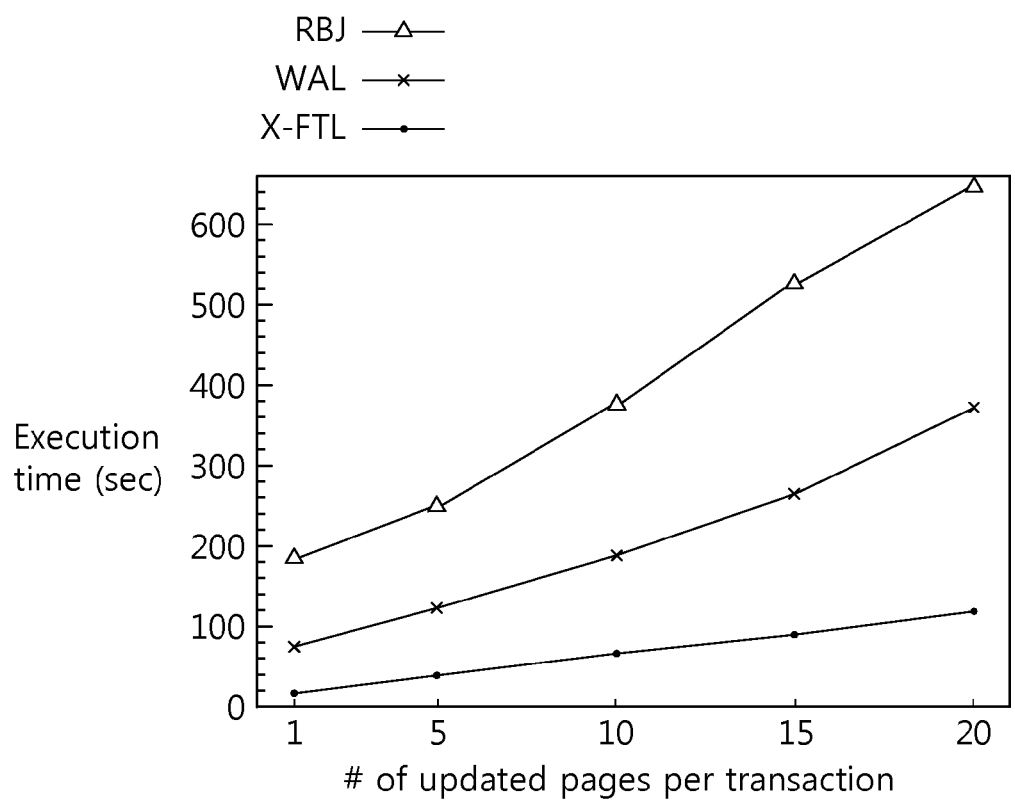

FIGS. 5A through 5C are diagrams illustrating an example of execution time of SQLite with respect to an experiment conducted while adjusting a valid page ratio per block by adjusting a usage degree of a flash chip.

Referring to FIGS. 5A through 5C, in synthetic workload, 1000 transactions were performed and experimented while changing the number of update requests per transaction from 1 to 20. In order to measure influence of garbage collection performed in the FTL, a degree of using a flash chip of OpenSSD was adjusted to 30% (please see FIG. 5A), 50% (please see FIG. 5B), and 70% (please see FIG. 5C) as percentages of valid pages per block, and experiments was conducted thereon.

As illustrated in FIGS. 5A through 5C, it can be seen that when the FTL was used, a speed for performing transaction by SQLite was faster than rollback or wal journal mode by 11.7 times and 3.2 times, respectively. It can be seen that the effects obtained by reducing a repeated write operation and an fsync system call lead to considerable enhancement of performance.

FIG. 6 is a diagram illustrating an example of an I/O state when the number of updated pages per transaction is 5.

Referring to FIG. 6, a host-side is a row in which the number of pages requesting write in SQLite, the number of metadata pages requesting write by a file system journal, and a total number of fsync system calls are recorded. In this example, an FTL-side is a row including the number of pages in which read/write was actually performed and the number of garbage collection. Namely, FIG. 6 is a table showing the comparison of rollback and wal journal modes, actual write of X-FTL, and the number of fsync calls. In the case of rollback mode, it can be seen that both of the two values are high. This is because a journal file is generated and deleted whenever transactions are executed and terminated in SQLite, and at this time, fsync is called. In the wal mode, an updated page is written repeatedly in a log file and an actual database file, resulting in two-fold pages being written.

Figure 7A:
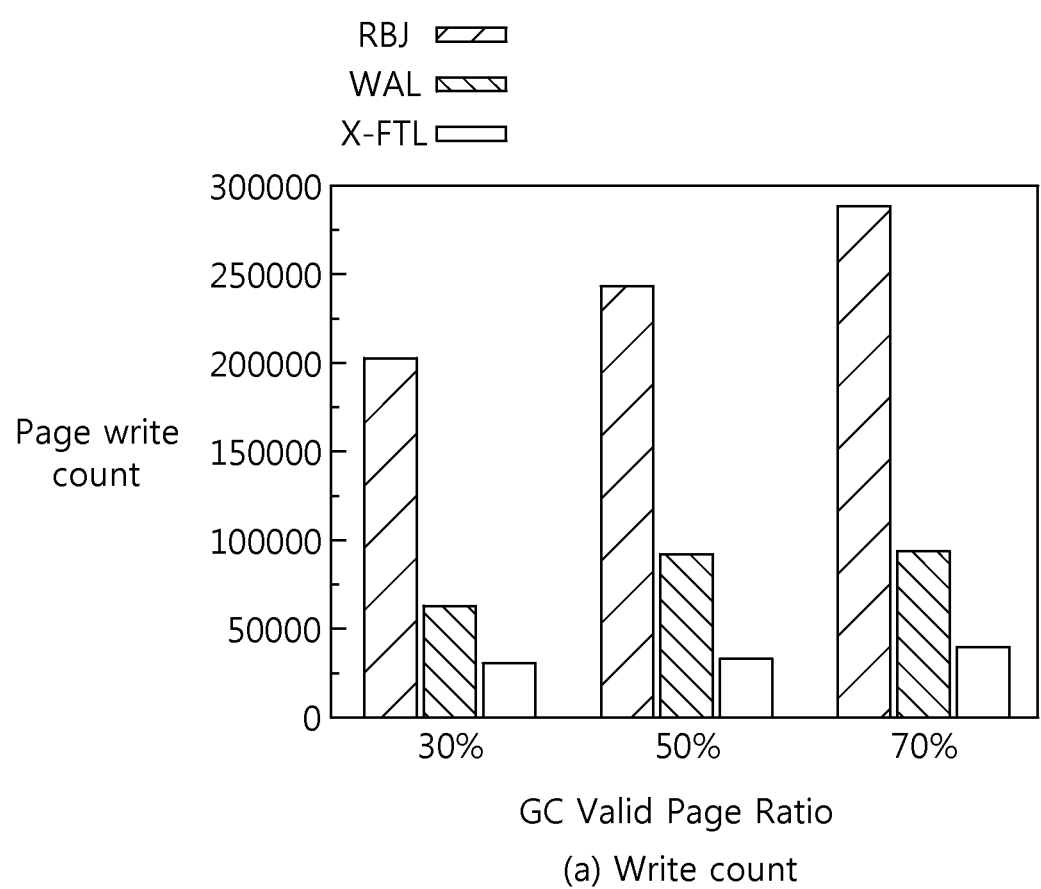
FIGS. 7A and 7B are diagrams illustrating an example of measurement values of an 'FTL-side' row.
Figure 7B:
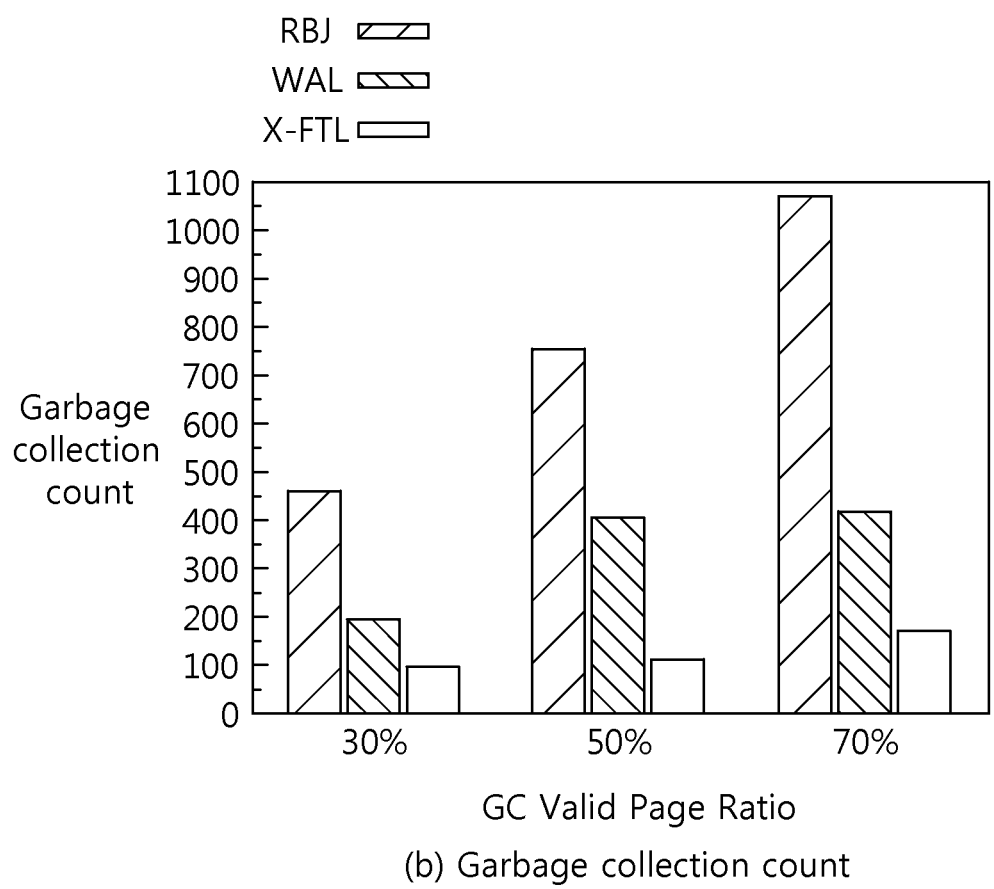

FIGS. 7A and 7B are diagrams illustrating an example of measurement values of the 'FTL-side' row. Here, FIG. 7A is a graph showing the number of write pages, and FIG. 7B is a graph showing the number of garbage collections. As illustrated in FIGS. 7A and 7B, it can be seen that an actual I/O aspect is consistently maintained with a performance evaluation execution time.

For example, in the rollback mode, each transaction requests write of five pages, write of one journal header page from a journal file. This results in a total of two fsync system calls; an fsync with respect to data pages and an fsync with respect to journal header pages are generated. When a transaction is normally terminated through commit, an operation of write five data pages and header pages in a database is performed and only one fsync call is called. Similarly, in the wal mode, each transaction requests write of five pages and write of one log header page, and one fsync is called therefor. Whenever a checkpoint operation is performed on a log file, an updated page is reflected in an actual database file. According to a basic policy of SQLite, a checkpoint is generated whenever 1000 pages are written in a log file, and in the experiment illustrated in FIG. 5, a total of five checkpoints were generated. As for updating with respect to a repeated page during recording in a log file, only the latest update is applied to a database file and previous updates are disregarded in the event of checkpoint. This results in the number of data pages requesting write actually in a database file being less than 5000.

In the case of the SQLite experiment using the X-FTL, a write request is made immediately in a database file without using any log file. Accordingly, it corresponds to a request for write of half pages in comparison to the wal mode.

Android Smartphone Workload

A total of four actual smartphone workloads were experimented on an OpenSSD board through SQLite. Similarly, experiments were conducted in rollback mode, wal mode, and off mode using X-FTL.

FIG. 8 is a diagram illustrating an example of traces of four types of actual android smart phones. Differences between the rollback mode and wal mode are similar to the results in the synthetic workload, so they were not included in the following experiment results.

Figure 9:
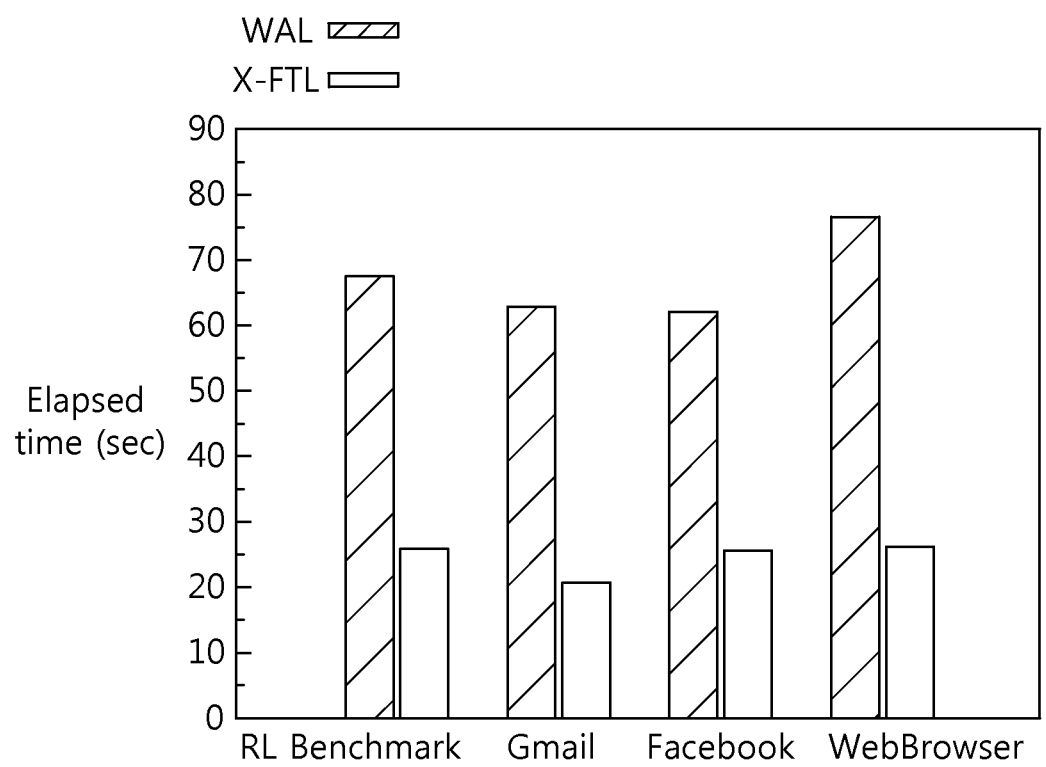
FIG. 9 is a diagram illustrating an example of a comparison of execution time with respect to workloads of four types of actual android smartphones.

FIG. 9 is a diagram illustrating an example of comparison of execution time with respect to workloads of four types of actual android smartphones. As shown in FIG. 9, it can be seen that off mode using the X-FTL according to this example was faster than the wal mode by 2.4 times to 3 times in four types of traces. These results are the same as the previous synthetic workload experiment results.

Referring to FIG. 8, in the example of the RL Benchmark, a write-intensive workload, a total of 13 tests were performed on a single table. This includes 50,000 inserts, 5,000 selects, and 25,000 updates, and index generation and table deletion tests.

Gmail traces include general operations such as storing a message of a mail box, fining a message in a mail box, and the like. In the case of Gmail, since everything related to a mail is stored in SQLite and used, most queries are made of insert syntax. A ratio of read and write is 3:7, so the write proportion is greater.

Facebook traces include operations of reading a new text, sending a message, uploading a photograph, and the like, through a Facebook application. A total of 11 database files are generated, a fb.db file is most frequently accessed. Similar to the Gmail workload, in Facebook, most information displayed in a screen is stored and managed in SQLite, so Facebook traces include a great amount of insert syntax. In Facebook, even photo files are stored and managed in a blob form through SQLite, and an update rate per transaction is higher than gmail. A ratio between read and write is 3:7, similar to gmail.

Browser traces include general operations such as reading a Web newspaper through an actual android Web browser, searching a portal site, searching a shopping site, the use of an SNS site, and the like. In Web browsers, information such as an old list, bookmark, a site name, thumbnails of photos, and the like, are stored and managed through SQLite. Since Web addresses of all visited pages are stored, update request are frequently made on a history table. In addition, whenever a Web page is accessed, an operation of inserting and deleting cookie information is performed. Accordingly, update operation is frequently performed on a cookie table. A total of six database files are generated, and among these, the browser2.db file is most frequently used. Peculiarity in the Web browser trace is that it includes a large amount of join queries. A ratio between read and write is 4:6.

TPC-C Benchmark

A total of four workloads of a write-intensive workload, a read-intensive workload, a selection workload, and a join workload were experimented on by adjusting percentages of five transaction types of TPC-C.

FIG. 10 is a diagram illustrating an example of adjusted percentages of five transaction types of TPC-C. Namely, a total of four workloads of a write-intensive workload, a read-intensive workload, a selection-intensive workload, and a join-intensive workload were experimented by adjusting percentages of five transaction types.

FIG. 11 is a diagram illustrating an example of results obtained through an experiment, by number of times of transaction performance.

Referring to FIGS. 10 and 11, in the case of the write-intensive workload, each transaction performs the updating of 2 pages on average. According to the performing results, a difference in performance between the mode using the X-FTL and the wal mode was not as much as that of the results of the synthetic workload. The reason for this is because every transaction does not include an updated one. Nonetheless, a difference in performance therebetween is very remarkable. Transaction throughput in the case of using the X-FTL is greater than the wal mode by 130%.

In the example of the read-intensive workload, the gap in performance between them further widens. It can be seen that the case of using the X-FTL has 137% greater transaction throughput. This results from differences due to additional cost incurred for the SQLite to retrieve the latest page with respect to the read-requested page. In the case of operating in the wal mode, twice the number of operations should be performed. A wal file is searched to obtain the latest page with respect to a read request, and when the latest page is not obtained, a database file is searched. In the case of using the X-FTL, additional costs for searching the wal file is saved.

In the example of the workload performing only select and join, it can be seen that there is little difference in performance between them. This is because there is no syntax for updating within a transaction. Accordingly, an actual page write request does not occur and data does not exist in a wal file. In the case of join, only nested-loop join is used in terms of implementation of SQLite, and thus, additional temporary file generation cost does not incur.

File System Benchmark

As collateral effects of the X-FTL, atomic write with respect to an application that performs disk input/output through a file system, as well as atomic write with respect to a case of using SQLite, can be guaranteed. Thus, an experiment was conducted to check what kind of influence the X-FTL may make on a file system itself by using an FIO performance evaluation tool. In this experiment, after one thread performed random write for 10 minutes with respect to a 4 GB region, an input/output number per second (IOPS) was measured. A size of a page was fixed to 8 KB, and a fsync system call was performed at every 1-page write, 5-page write, 10-page write, 15-page write, and 20-page write. A basic experiment was performed in an ordered journaling mode and a full journaling mode of an ext4 file system, and the X-FTL was performed in an off mode.

Figure 12:
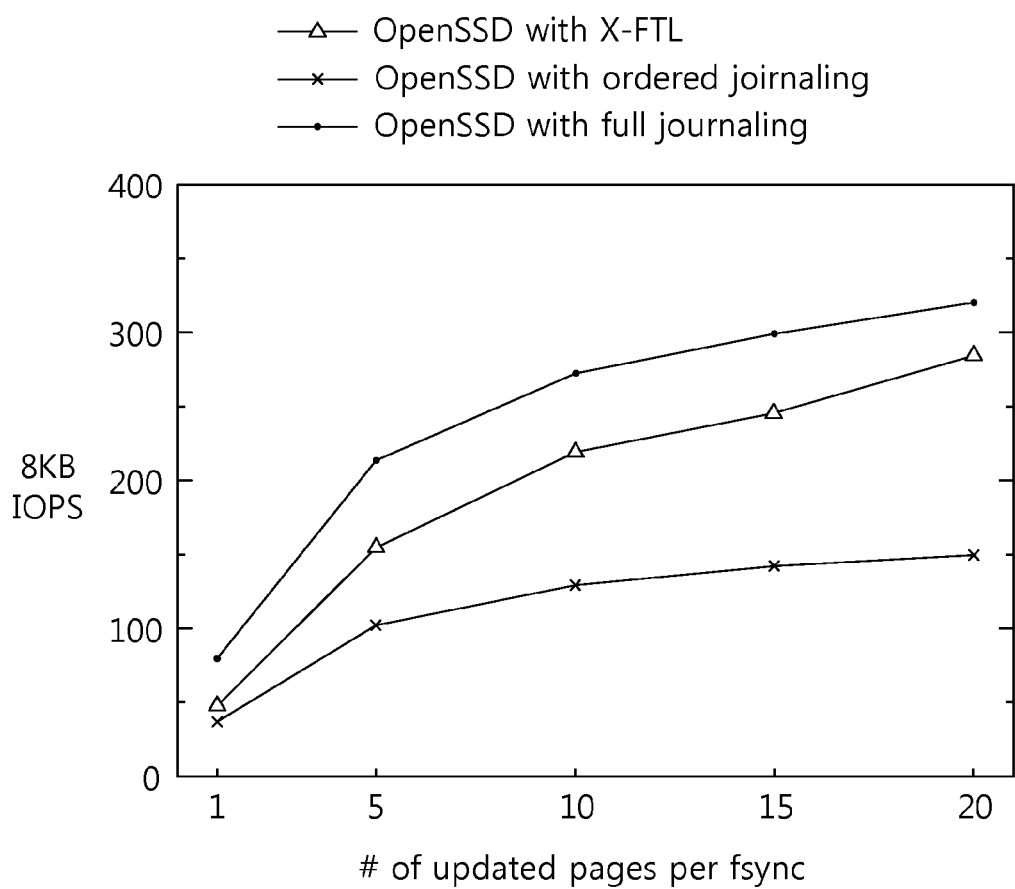
FIG. 12 is a diagram illustrating an example of an influence of X-FTL on a file system itself by using an FIO performance evaluation tool.

FIG. 12 is a diagram illustrating an example of influence of X-FTL on a file system itself by using an FIO performance evaluation tool.

Referring to FIG. 12, it can be seen that input/output throughput was drastically increased according to an fsync period. Also, it can be seen that, in the case of using the X-FTL, performance was better by about 63% to 110%, relative to the existing ordered or full journaling mode. As a result, it can be seen that the X-FTL has better performance as well as guaranteeing atomic write and consistency guaranteed by a file system.

Recovery Performance

In order to measure three types of recovery performance of the rollback mode, the wal mode, and the X-FTL in SQLite, power of OpenSSD was turned off and then turned on during synthetic workload experiment to measure a period of time for recovery. Each experiment had an average value of five experiments and included a time for recovering a database by SQLite. A time for recovering a basic FTL such as an L2P table by the existing OpenSSD and a time for mounting a file system are common parts, and thus, excluded. Each execution time was measured by connecting a debugging tool to OpenSSD.

FIG. 13 is a diagram illustrating an example of average recovery time in three types of modes.

Referring to FIG. 13, in the case of the rollback mode, time taken for recovery includes an undo operation time for duplicating a page of an old version to the original database file, and an average number of duplicated pages measured in the experiment was 10.

In the case of the wal mode, time taken for recovery includes a time for duplicating the latest file recorded in a wal file through commit to the original database file. Since the number of basic wal files is 1000, much time is taken relative to the rollback mode. In the experiment, a recovery time was measured on a single database file. Thus, in case of several database files, a recovery time measured on each file in the experiment may be additionally taken.

In the case of the X-FTL mode, a recovery time includes a time for reading the X-L2P table and reflecting mapping information regarding the latest pages committed in the X-L2P table to the L2P table, and a 3.5 ms time is required. Namely, in the case of the X-FTL mode according to various aspects, an additional page read/write operation is not required for recovery, so a recovery time is significantly shorter.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A non-transitory memory storage apparatus, comprising:
   a flash translation layer (FTL) configured to guarantee atomicity of a transaction for a database management system by utilizing a copy-on-write (CoW) mechanism,
   wherein the FTL comprises a transaction table generation unit configured to generate a transaction table that manages a transaction,
   wherein the transaction table comprises, with respect to each page, at least one of a transaction ID identifying a transaction, a logical page position, a physical page position, and information regarding a current state information of a transaction,
   wherein each entry of the transaction table is configured to be used to provide a page corresponding to each transaction request while maintaining a latest page number and a page number of an old version, which has been most recently committed and recorded,
   wherein in response to a read request command being entered and an entry in which both the transaction ID and the logical page position are identical exists in the transaction table, the FTL delivers the latest page, and otherwise, the FTL delivers the page of the old version, and
   wherein the memory storage apparatus is configured to interwork with the database management system and a file system.

2. The non-transitory memory storage apparatus of claim 1, wherein the FTL is configured to use a mixture of a page mapping table, showing a mapping relationship between a logical page position and a physical page position, and the transaction table.

3. The non-transitory memory storage apparatus of claim 1, wherein the transaction table comprises the current state information of the transaction, and the current state information of the transaction comprises information regarding whether a corresponding transaction is in progress, whether a corresponding transaction is a committed transaction, or whether a corresponding transaction is an aborted transaction.

4. The non-transitory memory storage apparatus of claim 1, wherein the FTL does not select pages written in previous positions of pages updated in the transaction table as victim pages until before a transaction is committed, and in response to the transaction being aborted, the FTL uses the pages for a rollback operation.

5. The non-transitory memory storage apparatus of claim 1, wherein in response to an activated transaction having been successfully committed, the FTL excludes the pages in the previous positions maintained in the transaction table from management targets and selects them as victim pages.

6. The non-transitory memory storage apparatus of claim 1, wherein the FTL uses a command for performing a write request, a command for performing a read request, a command for changing a state of a transaction into commit, and a command for changing a state of a transaction into abort, and wherein the command for performing the write request and the command for performing the read request include transaction information.

7. The non-transitory memory storage apparatus of claim 1, wherein transaction information is added to the transaction table only at a point in time at which a write request is received in response to a particular page having been changed.

8. The non-transitory memory storage apparatus of claim 1, wherein in response to a commit command for committing a transaction being entered, the FTL waits until all pages updated by a commit request-related transaction are entirely written to physical nand pages, and thereafter, the FTL changes the information regarding a current state with respect to the commit request-related transaction in the transaction table to commit, records the corresponding transaction table information in the storage permanently, and reflects the changed mapping information in the transaction table.

9. The non-transitory memory storage apparatus of claim 1, wherein the memory storage apparatus is an eMMC (embedded Multi Media Card)-based or flash memory-based storage.

10. A method for supporting a transaction in a memory storage apparatus, the method comprising:
guaranteeing, using a flash translation layer (FTL) of the memory storage apparatus, atomicity of a transaction for a database management system by utilizing a copy-on-write (CoW) mechanism;
generating a transaction table that manages a transaction, the transaction table comprising, with respect to each page, at least one of a transaction ID identifying a transaction, a logical page position, a physical page position, and information regarding a current state information of a transaction,
wherein each entry of the transaction table is configured to be used to provide a page corresponding to each transaction request while maintaining a latest page number and a page number of an old version, which has been most recently committed and recorded; and
delivering the latest page, in response to a read request where an entry exists, in the transaction table, in which both the transaction ID and the logical page position, of the entry, are identical to a corresponding transaction ID and logical page position of the read request, and otherwise, delivering the page of the old version, wherein the memory storage apparatus is configured to interwork with the database management system and a file system.

11. A non-transitory memory system, comprising:
a database management system configured to manage data of a device;
a file system configured to serve as a messenger which allows the use of a transaction function between the database management system and a memory storage apparatus; and
the memory storage apparatus configured to interwork with the database management system and the file system,
wherein the memory storage apparatus comprises a flash translation layer (FTL) configured to guarantee atomicity of a transaction for the database management system by utilizing a copy-on-write (CoW) mechanism,
wherein the FTL comprises a transaction table generation unit configured to generate a transaction table that manages the transaction,
wherein the transaction table comprises, with respect to each page, at least one of a transaction ID identifying the transaction, a logical page position, a physical page position, and information regarding a current state information of the transaction,
wherein each entry of the transaction table is configured to provide a page corresponding to each transaction request while maintaining a latest page number and a page number of an old version, which has been most recently committed and recorded, and
wherein in response to a read request command being entered and an entry in which both the transaction ID and the logical page position are identical exists in the transaction table, the FTL delivers the latest page, and otherwise, the FTL delivers the page of the old version which has been most recently committed and recorded.

12. The non-transitory memory system of claim 11, wherein
the FTL comprises a transaction table generation unit configured to generate a transaction table that manages the transaction; and
the transaction table comprises at least one of a transaction ID identifying the transaction, a logical page position, a physical page position, and a current state information of the transaction, with respect to each page.

13. The non-transitory memory system of claim 12, if wherein the database management system is configured to turn off a journal mode in order to immediately apply a changed page to a database file rather than to a journal file.

14. The non-transitory memory system of claim 12, wherein the database management system is configured to deliver an abort command through a device control function ioctl in order to instruct the memory storage apparatus to perform an operation related to abortion of the transaction.

15. The non-transitory memory system of claim 12, wherein In response to a particular page being modified by the transaction, the file system delivers the transaction ID together to the memory storage apparatus.

16. The non-transitory memory system of claim 12, wherein in response to a read or write request being entered, the file system translates the read or write request into a command in a form including the transaction ID and the logical page position for the read and write request and delivers the same to the memory storage apparatus.

17. The non-transitory memory system of claim 12, wherein in response to a function related to a commit or abort operation of the transaction being called, the file system translates the same into a command in a form including the transaction ID and the current state information of the transaction and transmits the same to the memory storage apparatus, and deletes a page that remains in a buffer of the file system even after abortion of the transaction.

* * * * *